United States Patent
Lin et al.

(10) Patent No.: US 8,484,802 B1
(45) Date of Patent: Jul. 16, 2013

(54) COMBINATION CASTOR WHOSE CASTOR ASSEMBLIES ARE BRAKED AND POSITIONED SIMULTANEOUSLY

(75) Inventors: Ming-Hsien Lin, Yongkang (TW); Feng-Hsi Yang, Tainan (TW)

(73) Assignee: Sunny Castors Co., Ltd., Tainan Hsien (TW)

( * ) Notice: Subject to any disclaimer, the term of this patent is extended or adjusted under 35 U.S.C. 154(b) by 7 days.

(21) Appl. No.: 13/347,776

(22) Filed: Jan. 11, 2012

(51) Int. Cl.
*B60B 33/00* (2006.01)

(52) U.S. Cl.
USPC .......................................................... 16/35 R

(58) Field of Classification Search
USPC ................... 16/35 R, 35 D, 37, 38; 188/1.12, 188/24.21, 24.22, 24.12, 24.13, 24.16, 24.19, 188/20, 29; 5/86.1, 600, 620; 280/87.042, 280/79.11, 47.11, 428, 651, 652, 658, 47.34, 280/47.38, 33.994
See application file for complete search history.

(56) References Cited

U.S. PATENT DOCUMENTS

| | | | | |
|---|---|---|---|---|
| 2,544,924 | A * | 3/1951 | Herold | 105/170 |
| 5,014,391 | A * | 5/1991 | Schulte | 16/35 R |
| 5,133,106 | A * | 7/1992 | Milbredt et al. | 16/35 R |
| 5,139,116 | A * | 8/1992 | Screen | 188/1.12 |
| 5,170,529 | A * | 12/1992 | Kovacs | 16/35 R |
| 6,321,878 | B1 * | 11/2001 | Mobley et al. | 188/1.12 |
| 6,360,851 | B1 * | 3/2002 | Yang | 188/1.12 |
| 7,698,760 | B2 * | 4/2010 | Reckelhoff et al. | 5/600 |
| 7,810,822 | B2 * | 10/2010 | Figel et al. | 280/47.38 |
| 7,861,370 | B2 * | 1/2011 | Chu | 16/35 R |
| 7,992,254 | B2 * | 8/2011 | Ahn et al. | 16/35 R |
| 8,205,297 | B2 * | 6/2012 | Fallshaw et al. | 16/35 R |
| 2004/0020008 | A1 * | 2/2004 | Harris et al. | 16/35 R |

* cited by examiner

*Primary Examiner* — Chuck Y. Mah
(74) *Attorney, Agent, or Firm* — Alan Kamrath; Kamrath IP Lawfirm, P.A.

(57) ABSTRACT

A combination castor includes a linking device, and a plurality of castor assemblies connected with the linking device. Each of the castor assemblies includes an operation unit, a braking unit, and at least one roller. The operation unit of each of the castor assemblies includes a mounting seat, a slide, and a driven block. The braking unit of each of the castor assemblies includes a bushing, a housing, a control shaft, and a braking member. The roller of each of the castor assemblies has an inner periphery provided with a plurality of locking grooves. Thus, the linking device can drive and operate the castor assemblies to brake and position the castor assemblies simultaneously.

7 Claims, 8 Drawing Sheets

US 8,484,802 B1

COMBINATION CASTOR WHOSE CASTOR ASSEMBLIES ARE BRAKED AND POSITIONED SIMULTANEOUSLY

BACKGROUND OF THE INVENTION

1. Field of the Invention

The present invention relates to a wheeled vehicle and, more particularly, to a combination castor for a cart, stroller, chair, wheelchair, patient bed, shelf, cabinet and the like.

2. Description of the Related Art

A conventional wheeled vehicle, such as a cart, stroller, chair and the like, comprises a main frame, a plurality of castors mounted on the bottom of the main frame, and a plurality of braking devices mounted on a respective one of the castors to brake and position each of the castors. However, the castors are controlled by the braking devices respectively so that a user has to lock each of the braking devices respectively so as to brake and position each of the castors and has to unlock each of the braking devices respectively so as to release each of the castors, thereby greatly causing inconvenience to the user when locking and unlocking the castors.

BRIEF SUMMARY OF THE INVENTION

In accordance with the present invention, there is provided a combination castor, comprising a linking device, and a plurality of castor assemblies connected with the linking device. Each of the castor assemblies comprises an operation unit, a braking unit connected with the operation unit, and at least one roller connected with the braking unit. The operation unit of each of the castor assemblies includes a mounting seat having an interior provided with a slideway, a slide slidably mounted in the slideway of the mounting seat and having a first end provided with a pivot portion pivotally connected with the linking device and a second end provided with a guide ramp and a guide slot, and a driven block abutting the slide and having a bottom provided with a pressing lug pressing the guide ramp of the slide. The braking unit of each of the castor assemblies includes a bushing mounted on the mounting seat of the operation unit, a housing rotatably mounted on the bushing, a top cap mounted on the bushing, a control shaft movably mounted in the bushing and having an upper end secured on the driven block of the operation unit to move in concert with the driven block of the operation unit and a lower end extended into the housing, and a braking member secured on the lower end of the control shaft to move in concert with the control shaft and having an end provided with a locking portion. The control shaft of the braking unit is in turn extended through the driven block of the operation unit, the guide slot of the slide, the mounting seat of the operation unit and the bushing and is extended into an inner space of the housing. The guide slot of the slide is slidable on the control shaft of the braking unit. The roller of each of the castor assemblies is rotatably mounted on the housing of the braking unit and has an inner periphery provided with a plurality of locking grooves which are arranged in an annular manner, and the locking portion of the braking member is movable into and releasably locked in one of the locking grooves of the roller.

The primary objective of the present invention is to provide a combination castor whose castor assemblies are braked and positioned simultaneously.

According to the primary advantage of the present invention, the linking device can drive and operate the castor assemblies so as to brake and position the castor assemblies simultaneously, thereby facilitating a user operating the castor assemblies.

According to another advantage of the present invention, the user only needs to drive the linking device so as to operate the castor assemblies simultaneously so that the user can control the castor assemblies easily and quickly.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
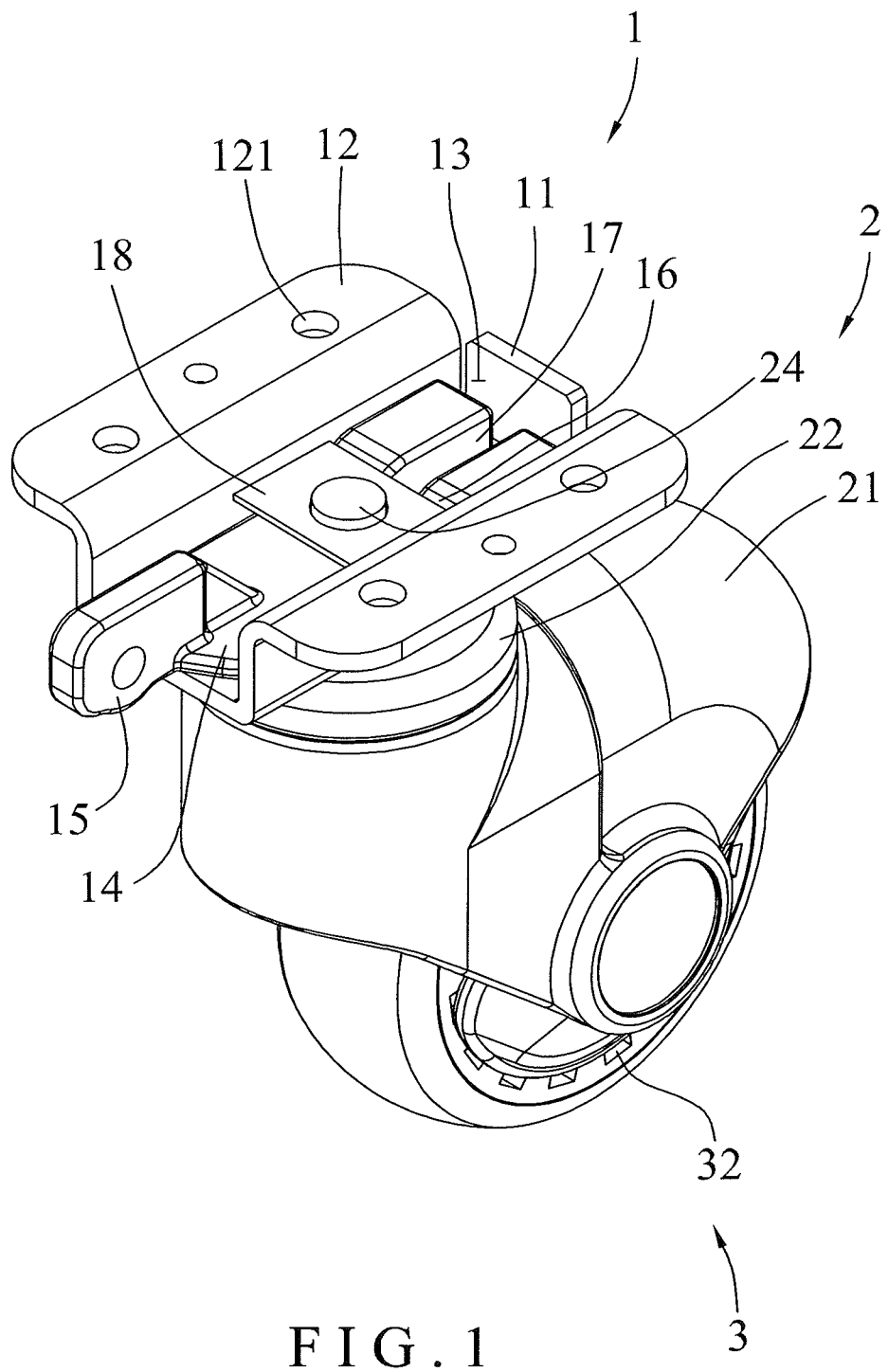
FIG. 1 is a partially perspective view of a combination castor in accordance with the preferred embodiment of the present invention.

Referring to the drawings and initially to FIGS. 1-4, a combination castor in accordance with the preferred embodiment of the present invention comprises a linking device 4, and a plurality of castor assemblies (see FIG. 8) connected with the linking device 4.

Each of the castor assemblies comprises an operation unit 1, a braking unit 2 connected with the operation unit 1, and at least one roller 3 connected with the braking unit 2.

The operation unit 1 of each of the castor assemblies includes a mounting seat 11 having an interior provided with a slideway 13, a slide 14 slidably mounted in the slideway 13 of the mounting seat 11 and having a first end provided with a pivot portion 15 pivotally connected with the linking device 4 and a second end provided with a guide ramp 16 and a guide slot 17, and a driven block 18 abutting the slide 14 and having a bottom provided with a pressing lug 19 pressing the guide ramp 16 of the slide 14.

The mounting seat 11 of the operation unit 1 is attached to the bottom of an object, such as a cart, stroller, chair and the like. The mounting seat 11 of the operation unit 1 has a substantially U-shaped profile and has two opposite sidewalls each provided with a protruded fixing ear 12 which has a plurality of fixing holes 121 for affixing the mounting seat 11 of the operation unit 1 to the bottom of the object. The pivot portion 15 of the slide 14 is driven by the linking device 4 so that the slide 14 of the operation unit 1 is movable in concert with the linking device 4. The guide slot 17 of the slide 14 traverses the guide ramp 16. The guide ramp 16 of the slide 14 is inclined with a determined angle so that the slide 14 of the operation unit 1 has a thinner first side and a thicker second side. The driven block 18 of the operation unit 1 is movably mounted in the slideway 13 of the mounting seat 11. The pressing lug 19 of the driven block 18 has an arcuate shape. The pressing lug 19 of the driven block 18 is pushed upward by the guide ramp 16 of the slide 14 when the slide 14 of the operation unit 1 is movable relative to the driven block 18 of the operation unit 1.

The braking unit 2 of each of the castor assemblies includes a bushing 23 mounted on the mounting seat 11 of the operation unit 1, a housing 21 rotatably mounted on the bushing 23, a top cap 22 mounted on the bushing 23, a control shaft 24 movably mounted in the bushing 23 and having an upper end secured on the driven block 18 of the operation unit 1 to move in concert with the driven block 18 of the operation unit 1 and a lower end extended into the housing 21, and a braking member 25 secured on the lower end of the control shaft 24 to move in concert with the control shaft 24 and having an end provided with a locking portion 26.

The top cap 22 of the braking unit 2 is secured on the bushing 23 and is disposed above the housing 21. The top cap 22 of the braking unit 2 has a disk shape and has a bottom provided with a plurality of positioning holes 221 which are arranged in an annular manner. The bushing 23 of the braking unit 2 is secured on the mounting seat 11 of the operation unit 1 and is extended through the top cap 22. The control shaft 24 of the braking unit 2 is in turn extended through the driven block 18 of the operation unit 1, the guide slot 17 of the slide 14, the mounting seat 11 of the operation unit 1 and the bushing 23 and is extended into an inner space 210 of the housing 21. The guide slot 17 of the slide 14 is slidable on the control shaft 24 of the braking unit 2. The braking member 25 of the braking unit 2 is received in the housing 21 and has a side provided with a pushing portion 27.

The braking unit 2 of each of the castor assemblies further includes a positioning shaft 28 movably mounted in the housing 21 and having a lower end pushed by the pushing portion 27 of the braking member 25 and an upper end that is movable into and detachably positioned in one of the positioning holes 221 of the top cap 22, and two elastic members 29 mounted in the housing 21 and biased between the positioning shaft 28, the pushing portion 27 of the braking member 25 and the housing 21. The positioning shaft 28 of the braking unit 2 is extended through the housing 21. An upper one of the elastic members 29 is mounted on the positioning shaft 28 and is biased between the housing 21 and the lower end of the positioning shaft 28, and a lower one of the elastic members 29 is biased between the lower end of the positioning shaft 28 and the pushing portion 27 of the braking member 25.

The roller 3 of each of the castor assemblies is rotatably mounted on the housing 21 of the braking unit 2 and has an inner periphery provided with a plurality of locking grooves 32 which are arranged in an annular manner, and the locking portion 26 of the braking member 25 is movable into and releasably locked in one of the locking grooves 32 of the roller 3. Each of the locking grooves 32 of the roller 3 has an edge provided with an oblique guide face 321 to guide movement of the locking portion 26 of the braking member 25.

Figure 2:
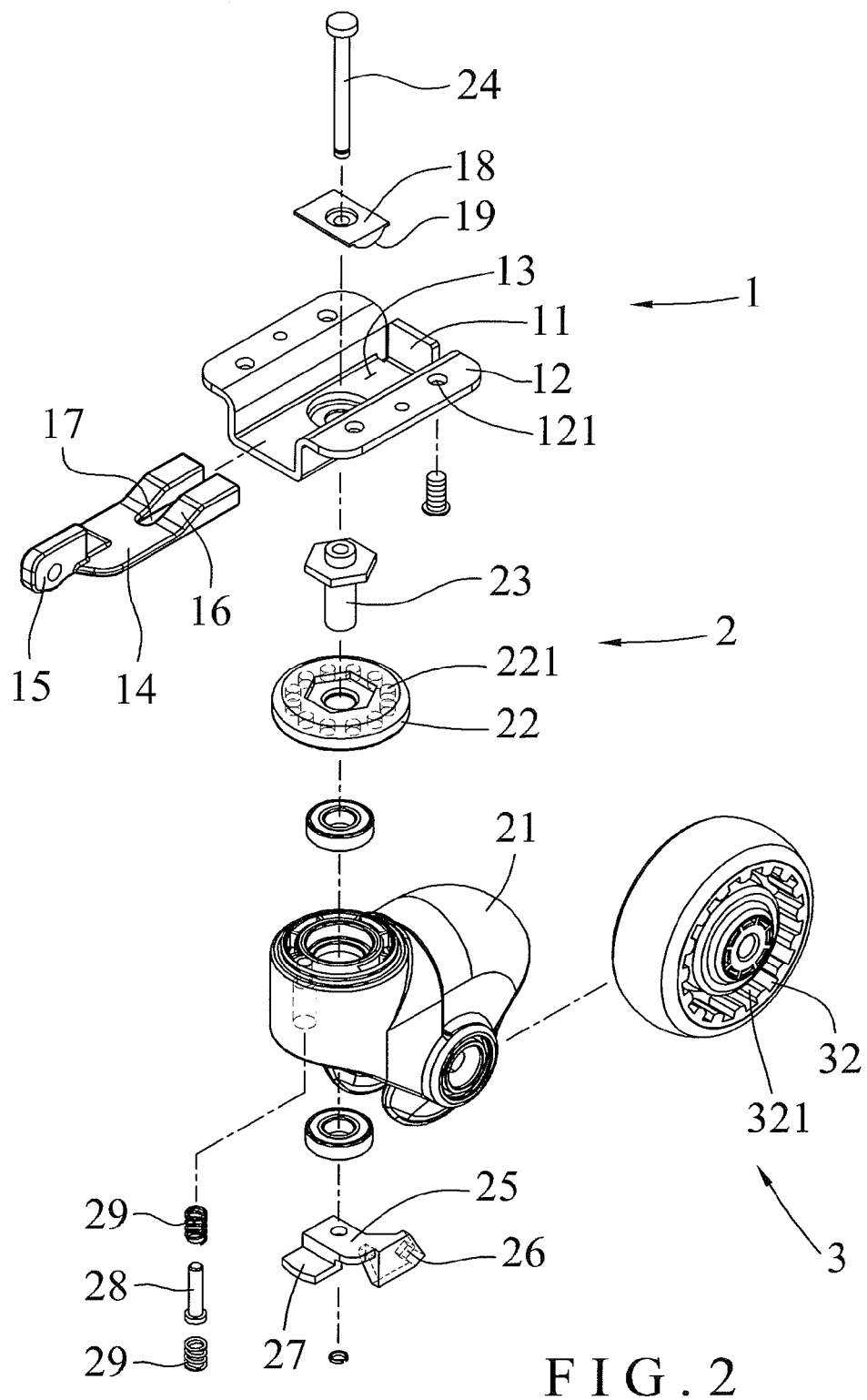
FIG. 2 is an exploded perspective view of the combination castor as shown in FIG. 1.
Figure 3:
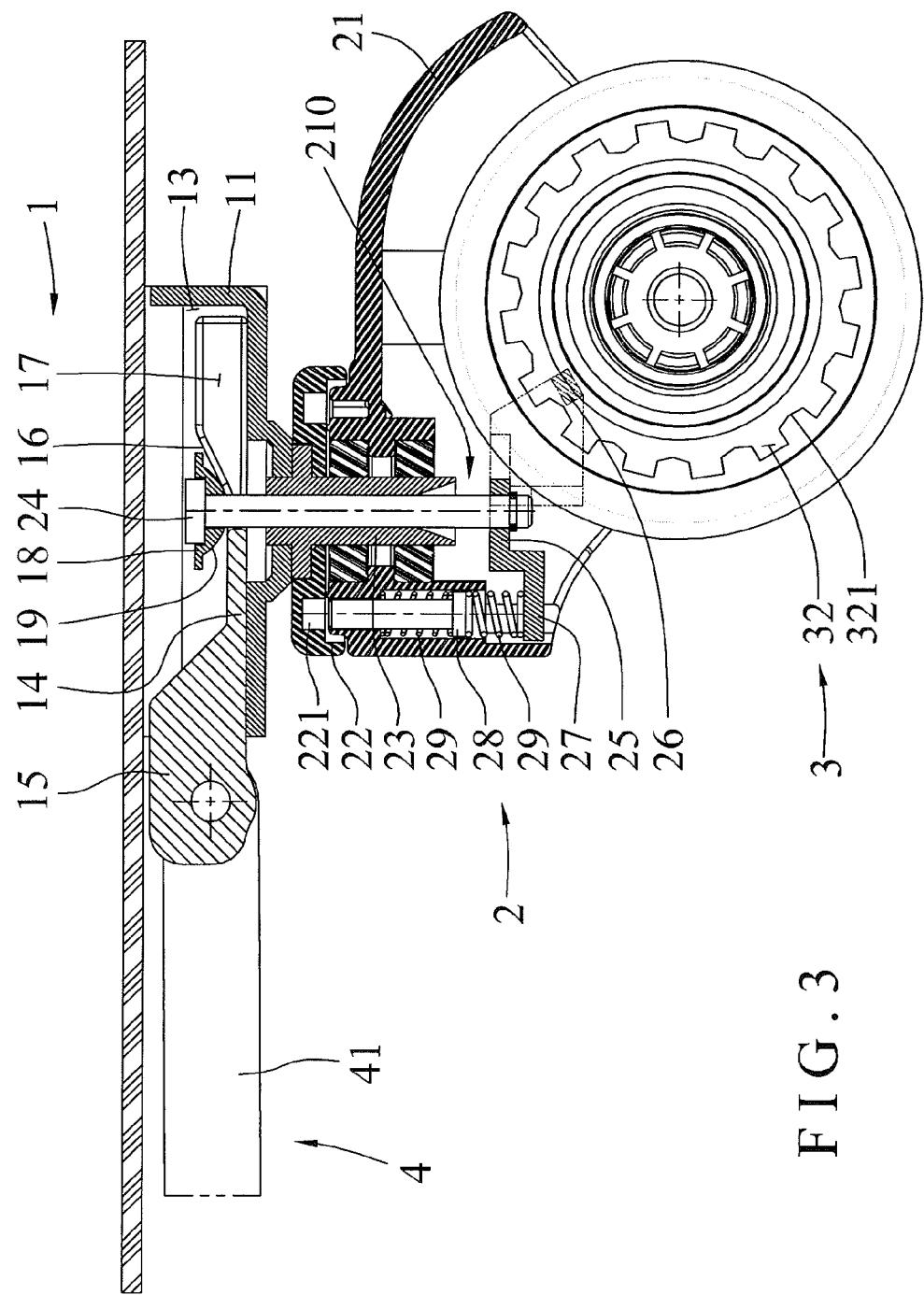
FIG. 3 is a side cross-sectional view of the combination castor as shown in FIG. 1.
Figure 4:
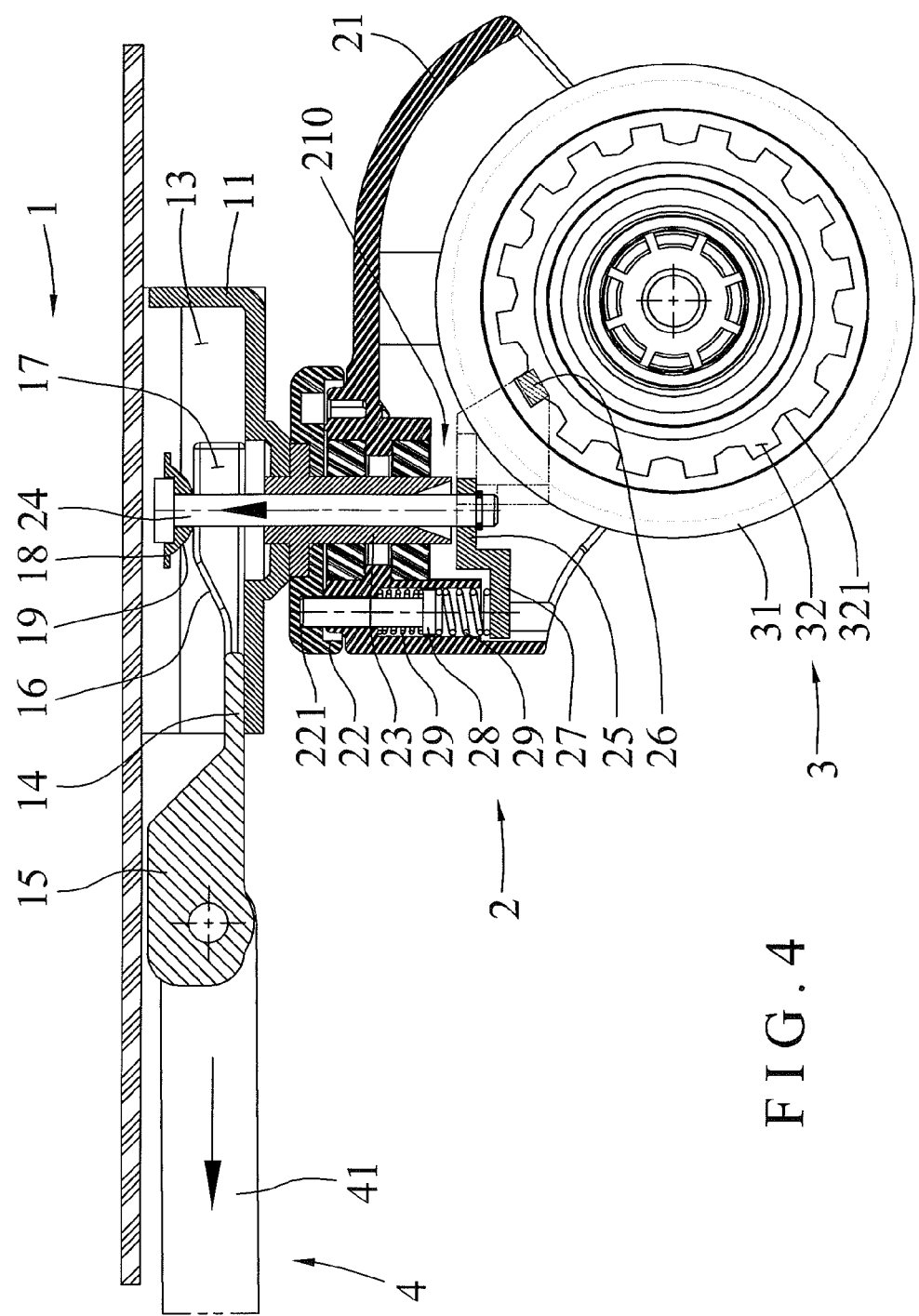
FIG. 4 is a schematic operational view of the combination castor as shown in FIG. 3.

In operation, referring to FIGS. 3 and 4 with reference to FIGS. 1 and 2, when the pivot portion 15 of the slide 14 of each of the castor assemblies is pulled by the linking device 4, the slide 14 of each of the castor assemblies is moved to displace the guide ramp 16 which presses the pressing lug 19 upward which lifts the driven block 18 which lifts the control shaft 24 which lifts the braking member 25 which moves the locking portion 26 toward the locking grooves 32 of the roller 3 so that the locking portion 26 of the braking member 25 is moved into and locked in one of the locking grooves 32 of the roller 3 so as to brake the roller 3. At the same time, the pushing portion 27 of the braking member 25 is moved upward to push the positioning shaft 28 toward the top cap 22 so that the positioning shaft 28 is moved into and positioned in one of the positioning holes 221 of the top cap 22 so as to locate the housing 21 and to position the roller 3 in place.

On the contrary, when the pivot portion 15 of the slide 14 of each of the castor assemblies is pushed backward by the linking device 4, the slide 14 of each of the castor assemblies is moved to displace the guide ramp 16 so that the guide ramp 16 is moved to the original position to release the pressing lug 19 which releases the driven block 18 which releases the control shaft 24 which releases the braking member 25 which releases the positioning shaft 28. In such a manner, the positioning shaft 28 is pushed and moved downward by the restoring force of the elastic members 29 to detach from one of the positioning holes 221 of the top cap 22 so as to unlock the housing 21 so that the housing 21 can be swiveled relative to the top cap 22 freely. At the same time, the braking member 25 is pushed and moved downward by the restoring force of the elastic members 29 to move and detach the locking portion 26 from one of the locking grooves 32 of the roller 3 so as to unlock the roller 3 so that the roller 3 can be rolled relative to the housing 21 freely.

Figure 5:
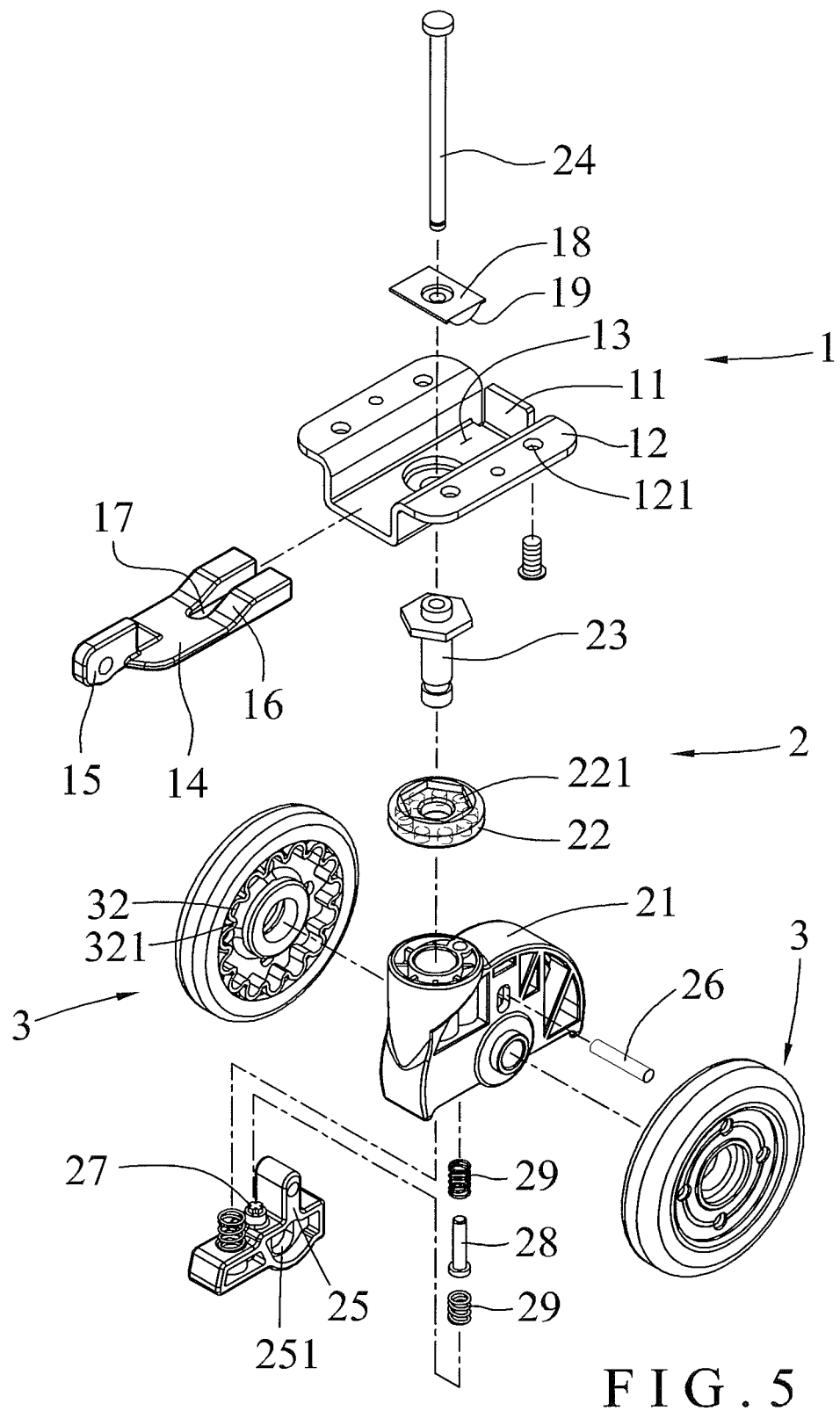
FIG. 5 is a partially exploded perspective view of a combination castor in accordance with another preferred embodiment of the present invention.
Figure 6:
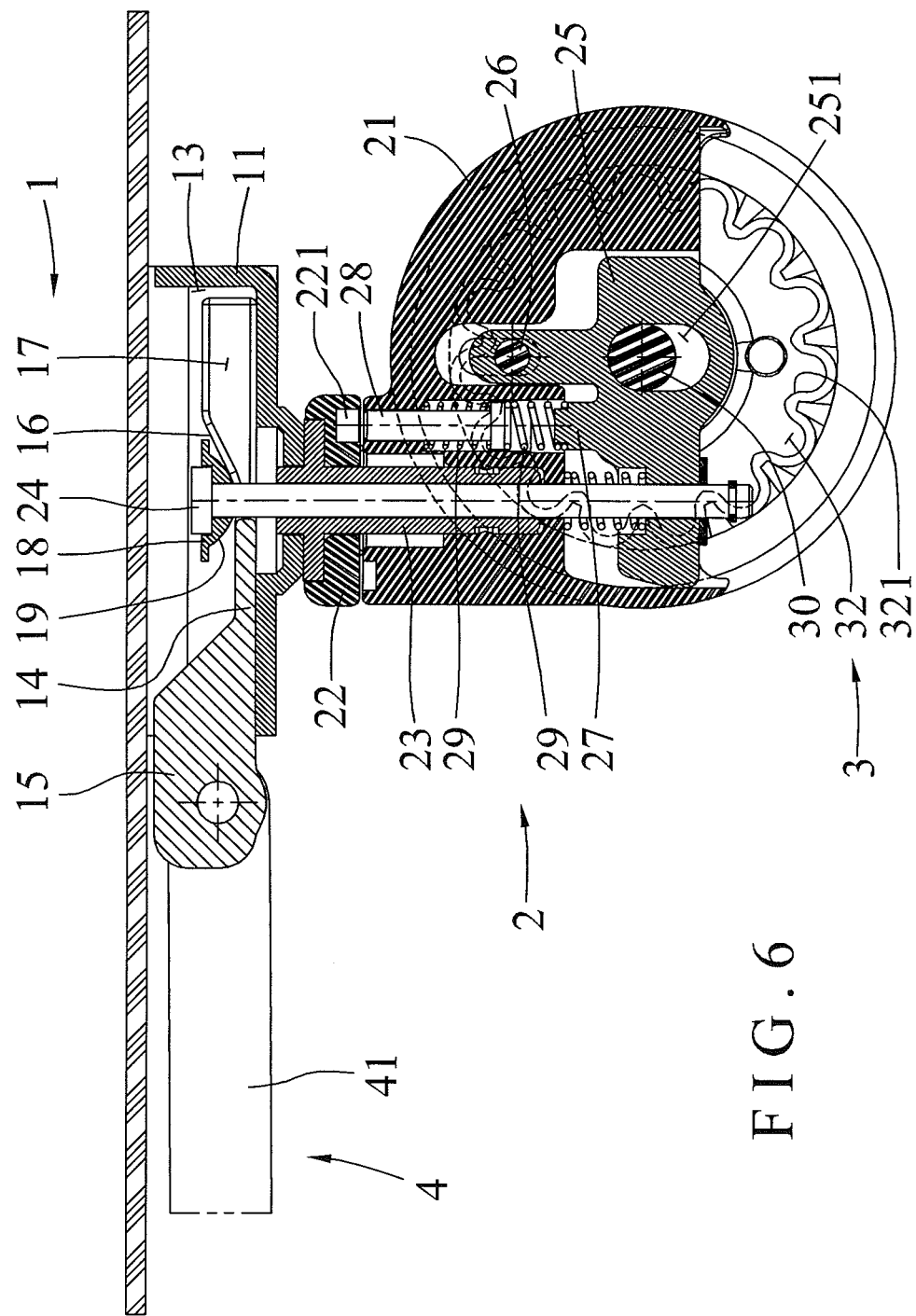
FIG. 6 is a side cross-sectional assembly view of the combination castor as shown in FIG. 5.
Figure 7:
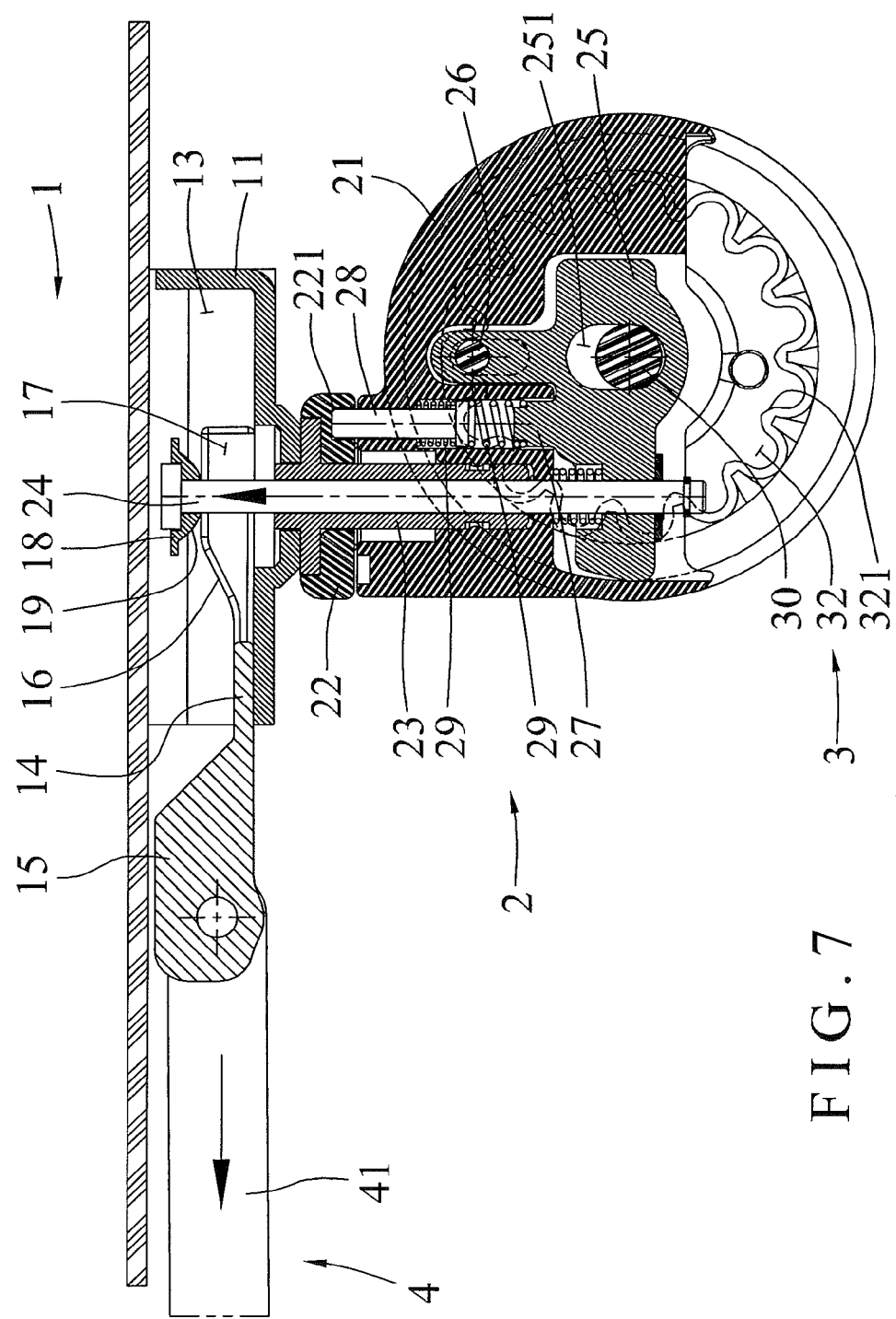
FIG. 7 is a schematic operational view of the combination castor as shown in FIG. 6.

Referring to FIGS. 5-7 with reference to FIGS. 1-4, each of the castor assemblies comprises two rollers 3 connected with the braking unit 2. The rollers 3 of each of the castor assemblies are rotatably mounted on two opposite sides of the housing 21. Each of the rollers 3 has an inner periphery provided with a plurality of locking grooves 32 which are arranged in an annular manner. The locking portion 26 of the braking member 25 is extended through and movable in the housing 21. The locking portion 26 of the braking member 25 has two opposite ends each protruded outwardly from the housing 21 and each movable into and releasably locked in one of the locking grooves 32 of each of the rollers 3. Each of the castor assemblies further comprises a mandrel 30 extended through each of the rollers 3, the housing 21 and the braking member 25. The braking member 25 of the braking unit 2 has a surface provided with an elongate guiding slot 251 slidable on the mandrel 30 so that the braking member 25 of the braking unit 2 is movable relative to the mandrel 30.

Figure 8:
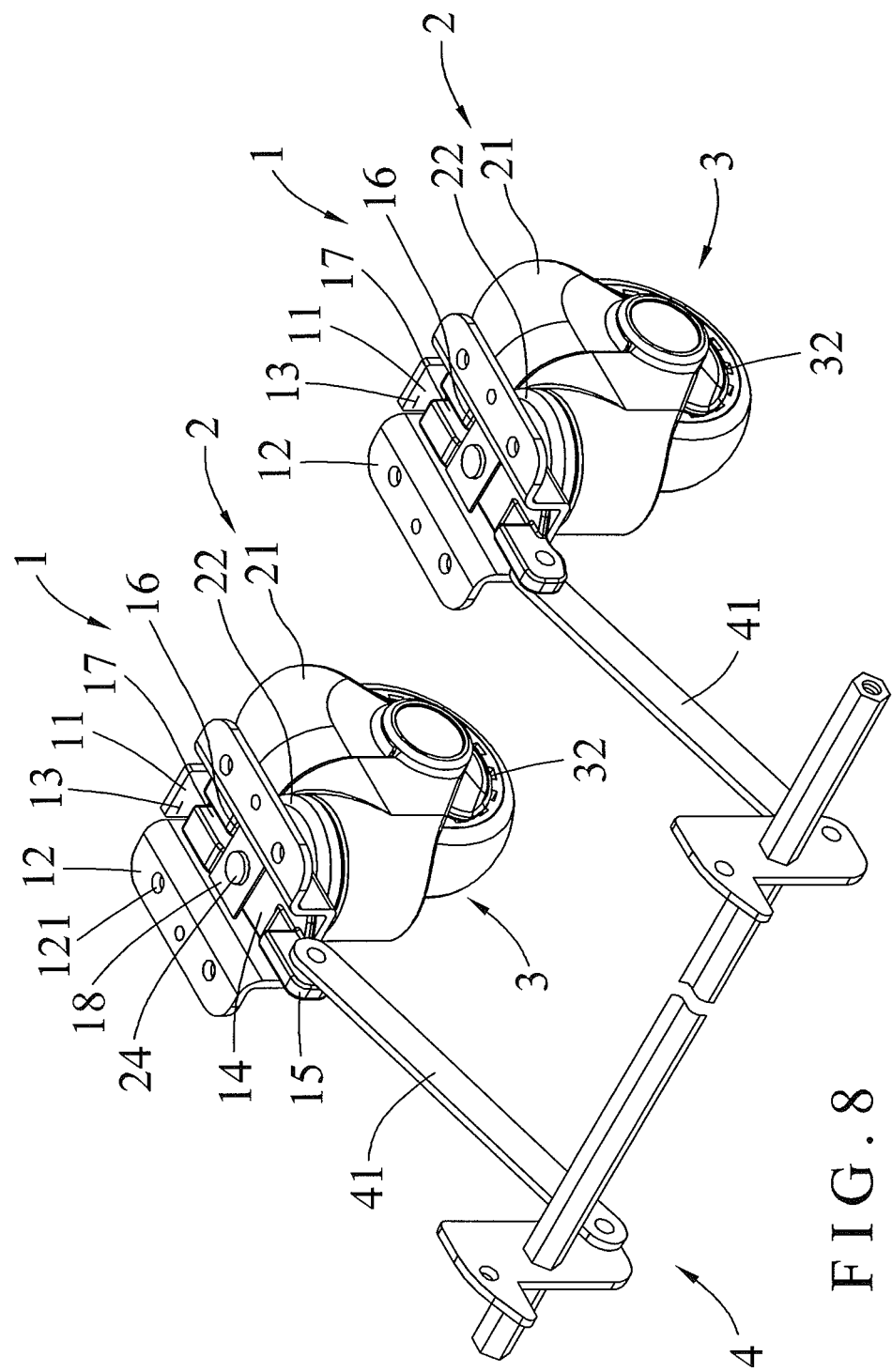
FIG. 8 is a perspective view of a combination castor in accordance with another preferred embodiment of the present invention.

Referring to FIG. 8 with reference to FIGS. 1-4, the linking device 4 includes a plurality of links 41 each having an end pivotally connected with the pivot portion 15 of the slide 14 of a respective one of the castor assemblies. Thus, the linking device 4 drives the castor assemblies simultaneously.

Accordingly, the linking device 4 can drive and operate the castor assemblies so as to brake and position the castor assemblies simultaneously, thereby facilitating a user operating the castor assemblies. In addition, the user only needs to drive the linking device 4 so as to operate the castor assemblies simultaneously so that the user can control the castor assemblies easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A combination castor, comprising:
a linking device; and
a plurality of castor assemblies connected with the linking device;

wherein each of the castor assemblies comprises:
an operation unit;
a braking unit connected with the operation unit; and
at least one roller connected with the braking unit;
the operation unit of each of the castor assemblies includes:
a mounting seat having an interior provided with a slideway;
a slide slidably mounted in the slideway of the mounting seat and having a first end provided with a pivot portion pivotally connected with the linking device and a second end provided with a guide ramp and a guide slot; and
a driven block abutting the slide and having a bottom provided with a pressing lug pressing the guide ramp of the slide;
the braking unit of each of the castor assemblies includes:
a bushing mounted on and extending downward from the mounting seat of the operation unit;
a housing rotatably mounted on the bushing;
a top cap mounted on the bushing;
a control shaft movably mounted in the bushing and having an upper end secured on the driven block of the operation unit to move in concert with the driven block of the operation unit and a lower end extended into the housing; and
a braking member secured on the lower end of the control shaft to move in concert with the control shaft and having an end provided with a locking portion;
the control shaft of the braking unit is in turn extended through the driven block of the operation unit, the guide slot of the slide, the mounting seat of the operation unit and the bushing and is extended into an inner space of the housing;
the guide slot of the slide is slidable on the control shaft of the braking unit;
the roller of each of the castor assemblies is rotatably mounted on the housing of the braking unit and has an inner periphery provided with a plurality of locking grooves which are arranged in an annular manner;
the locking portion of the braking member is movable into and releasably locked in one of the locking grooves of the roller.

2. The combination castor of claim 1, wherein
each of the castor assemblies comprises two rollers connected with the braking unit;
the rollers of each of the castor assemblies are rotatably mounted on two opposite sides of the housing;
each of the rollers has an inner periphery provided with the locking grooves;
the locking portion of the braking member is extended through and movable in the housing;
the locking portion of the braking member has two opposite ends each protruded outwardly from the housing and each movable into and releasably locked in one of the locking grooves of each of the rollers;
each of the castor assemblies further comprises a mandrel extended through each of the rollers, the housing and the braking member;
the braking member of the braking unit has a surface provided with an elongate guiding slot slidable on the mandrel so that the braking member of the braking unit is movable relative to the mandrel.

3. The combination castor of claim 1, wherein each of the locking grooves of the roller has an edge provided with an oblique guide face to guide movement of the locking portion of the braking member.

4. The combination castor of claim 1, wherein the mounting seat of the operation unit has two opposite sidewalls each provided with a protruded fixing ear which has a plurality of fixing holes for affixing the mounting seat of the operation unit to a bottom of an object.

5. The combination castor of claim 1, wherein a bottom of the pressing lug of the driven block has an arcuate shape.

6. The combination castor of claim 1, wherein
the top cap of the braking unit has a bottom provided with a plurality of positioning holes which are arranged in an annular manner;
the braking member of the braking unit is received in the housing and has a side provided with a pushing portion;
the braking unit of each of the castor assemblies further includes:
a positioning shaft movably mounted in the housing and having a lower end pushed by the pushing portion of the braking member and an upper end that is movable into and detachably positioned in one of the positioning holes of the top cap; and
two elastic members mounted in the housing and biased between the positioning shaft, the pushing portion of the braking member and the housing.

7. The combination castor of claim 6, wherein
the driven block of the operation unit is movably mounted in the slideway of the mounting seat;
the pressing lug of the driven block is pushed upward by the guide ramp of the slide when the slide of the operation unit is movable relative to the driven block of the operation unit;
the top cap of the braking unit is secured on the bushing and is disposed above the housing;
the bushing of the braking unit is secured on the mounting seat of the operation unit and is extended through the top cap;
the positioning shaft of the braking unit is extended through the housing;
an upper one of the elastic members is mounted on the positioning shaft and is biased between the housing and the lower end of the positioning shaft;
a lower one of the elastic members is biased between the lower end of the positioning shaft and the pushing portion of the braking member.

\* \* \* \* \*